United States Patent [19]

Schürmann et al.

[11] Patent Number: 4,839,415
[45] Date of Patent: Jun. 13, 1989

[54] PAPER SIZING AGENTS, THE MANUFACTURE AND USE OF SAME

[75] Inventors: Horst Schürmann, Düren; Hans-Joachim Weissen; Klaus Schloter, both of Kreuzau, all of Fed. Rep. of Germany

[73] Assignee: Akzo N.V., Arnheim, Netherlands

[21] Appl. No.: 46,697

[22] Filed: May 7, 1987

[30] Foreign Application Priority Data

May 10, 1986 [DE] Fed. Rep. of Germany ....... 3615855

[51] Int. Cl.$^4$ .............................................. C08L 37/00
[52] U.S. Cl. .................................. 524/549; 525/327.6
[58] Field of Search ....................... 524/549; 525/327.6

[56] References Cited

U.S. PATENT DOCUMENTS

| | | | |
|---|---|---|---|
| 2,926,116 | 2/1960 | Keim | 162/164 |
| 2,961,347 | 11/1960 | Floyd | 117/141 |
| 2,977,334 | 3/1961 | Zopf et al. | 524/549 |
| 3,332,901 | 7/1967 | Keim | 260/29.2 |
| 3,583,948 | 6/1971 | Blechinger | 260/78 |
| 4,065,608 | 12/1977 | Beck et al. | 526/49 |
| 4,075,177 | 2/1978 | Bonnet et al. | 260/75 |
| 4,226,749 | 10/1980 | Veaute | 260/17.3 |
| 4,287,110 | 9/1981 | Takagishi et al. | 260/29.2 |
| 4,336,835 | 6/1982 | Takagishi et al. | 162/164.3 |
| 4,381,367 | 4/1983 | von Bonin et al. | 524/549 |
| 4,423,194 | 12/1983 | Löach et al. | 525/327.6 |

FOREIGN PATENT DOCUMENTS

1088208 10/1967 United Kingdom .

*Primary Examiner*—Joseph L. Schofer
*Assistant Examiner*—J. M. Reddick
*Attorney, Agent, or Firm*—Oliff & Berridge

[57] ABSTRACT

Cationic sizing agents for paper are manufactured by reaction of alpha-olefins with maleix anhydride, imidation of the resulting copolymer with a polyamine having at least one tertiary and one primary amino group, and quaternization of the imide with epichlorohydrin in the presence of water. Copolymers with an average molecular weight of 3000 to 30,000 are used for the conversion into imide. 1 to 50% of the amino groups of the resulting polymeric imide-amine are neutralized with an acid; after partial neutralization, the mixture is diluted with water to a 5 to 50 weight-% emulsion, then quaternized with epichlorohydrin. The sizing agent is especially suitable as a surface-sizing agent and for the sizing of paper from secondary fibers.

12 Claims, No Drawings

PAPER SIZING AGENTS, THE MANUFACTURE AND USE OF SAME

TECHNICAL FIELD

The invention relates to cationic sizing agents for paper and to the manufacture and use thereof. The sizing agents are obtained by copolymerization of alpha-olefins with maleic anhydride, imidation of the copolymer with diamines, and quaternization of the imide-amine with epichlorohydrin.

BACKGROUND

The manufacture of sizing agents of the above-mentioned type and their use in the sizing of paper are known in the art. Thus, a process for the manufacture of such cationic sizing agents is described in Unexamined West German Patent Application DE-OS 1,570,914. The sizing agents produced in this manner, however, tend to gel and therefore must be treated with acid after their manufacture; this necessitates the use of alkali shortly before or during the sizing process.

If an excessively low molar amount of maleic anhydride is used relative to the alpha-olefin, sizing agents are obtained that are soluble or dispersible only with difficulty in water. Excess maleic anhydride produces inferior or mediocre sizing agents. Moreover, the process can be used only in a relatively narrow range of copolymer molecular weights. If copolymers with a molecular weight greater than 5000 are used, the product's tendency to gel increases rapidly.

The storage stability of the product leaves much to be desired; in addition, the epoxide groups tend to hydrolyze to a considerable extent so that, before use of the product, the alcohol groups formed by hydrolysis must again be transformed into epoxide groups during sizing by way of an etching agent.

For this reason, there still is a need for an improved process for the manufacture of such cationic sizing agents, which are distinguished by improved properties.

SUMMARY OF THE INVENTION

The invention has as an object the provision of a process of the manufacture of this type of sizing agent, whereby said process does not exhibit the above-mentioned disadvantages and produces sizing agents with better characteristics.

Another object of the invention is to provide sizing agents that are particularly suitable for surface-sizing of paper and are particularly advantageous for the sizing of paper made from so-called secondary fibers.

These and other objects are achieved by a process for the manufacture of a cationic sizing agent for paper comprising reaction of alpha-olefins with maleic anhydride to form a copolymer, imidation of the copolymer with a polyamine with at least one tertiary and one primary amino group, and quaternization of the imide with epichlorohydrin in the presence of water. The alpha-olefins are reacted with maleic anhydride at a molar ratio of alpha-olefin to maleic anhydride of 1:0.8 to 1:2 to form a copolymer with an average molecular weight of 3000 to 30,000. The copolyer is imidated with the polyamine at a molar ratio of anhydride group to polyamine of 2:1 to 1:1. 1 to 50% of the amino groups of the obtained polymeric imide-amine are neutralized with an acid, and the partially neutralized imide-amine is diluted with water to a 5 to 50 weight-% emulsion, and then quaternized with epichlorohydrin.

DETAILED DESCRIPTION OF THE PREFERRED EMBODIMENTS OF THE INVENTION

A molar ratio of anhydride group to polyamine of 1.4:1 to 1:1 is preferred.

Aliphatic diamines with one tertiary and one primary amino group are especially suitable as polyamines.

Preferably, the copolymer has an average molecular weight of 5000 to 15,000.

The manufacture of the copolymer can be carried out by bulk polymerization at temperatures of 140°–200° C. Polymerization at a temperature higher than 200° C. is less advisable, because mostly low-molecular-weight polymers may arise in this case.

Preferably, 1-20% of the amino groups of the resulting polymeric imide-amine are neutralized. Mineral acid, preferably sulfuric acid, is employed to neutralize the amino groups.

Advantageously, the partially neutralized imide-amine is diluted with water to a 5 to 50% emulsion.

The quaternization with epichlorohydrin is preferably carried out at a temperature of 10° to 30° C., more preferably at room temperature.

Another object of the invention is to provide sizing agents obtained according to the process described above. The sizing agents of the invention are especially suitable as surface-sizing agents for paper; they are additionally suitable for the sizing of paper made from secondary fibers, especially for the sizing of grades of liner paper.

The copolymer can be manufactured from alpha-olefins and maleic anhydride according to methods known from the prior art. Alpha-olefins are defined as typical alkenes with a double bond at the alpha position, especially those with 8 to 30 carbon atoms. Alpha-olefins with 14 to 24 carbon atoms are preferred. Alpha-olefins are also defined as vinyl compounds such as vinyl ether, styrene, and alkyl-substituted styrenes, which can be used alone or in a mixture with substituted or unsubstituted alkenes.

The polymerization of the alpha-olefin and maleic anhydride can be carried out according to conventional processes, e.g., bulk or solvent polymerization. Aromatic hydrocarbons such as toluene or xylene are especially suitable solvents for solvent polymerization.

Conventional initiators, which promote radical formation, can be used for the polymerization; these include, for example, di-tert-butyl peroxide, tert-butyl perbenzoate, etc. The molecular weight can be regulated, inter alia, by the concentration of the initiator. Thus, the molecular weight of the resulting copolymer is lowered by raising the initiator concentration.

In order to obtain the preferred molecular weights of 5000 to 15,000, it is necessary that the polymerization be carried out accurately. Thus, the molecular weight is reduced by elevating the temperature during polymerization. Decreasing the initiator concentration causes an increase in molecular weight. In solvent polymerization, the molecular weight can also be regulated by the concentration of the monomer.

If suitable and useful copolymers are likewise obtained by processes such as solvent polymerization, emulsion polymerization, etc., the process of bulk polymerization is still preferred, because a copolymer is formed from which solvents and dispersing agents need not be removed. This process is best carried out at temperatures between 140° and 200° C.

Preferably used as polyamines with at least one primary amino group and one tertiary amino group are aliphatic diamines of the general formula:

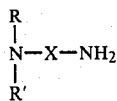

wherein X is an alkylene residue with 2 to 10, preferably 2 to 5, carbon atoms, R is an alkyl residue with 1 to 4 carbon atoms, preferably 1 to 2 carbon atoms, and R' is an alkyl residue with 1 to 4, preferably 1 to 2 carbon atoms. Both R and R', as well as X, can carry substituents, which, however, should be reaction-indifferent to the anhydride function of the copolymer, i.e., they must have a much lower reactivity than the primary amino group of the amine.

Other diamines or polyamines can also be used instead of the above-mentioned aliphatic diamines; these include, for example, those which are aliphatic, cycloaliphatic, or aromatic in nature or have other amino groups in addition to the one tertiary and one primary amino group established as a minimum requirement. A possible example is N,N-dimethyl-1,4-phenylene-diamine.

Preferable diamines of said type are N,N-dialkylamino-alkylenediamines, such as N,N-dimethyl-1,3-propanediamine or N,N-dimethylethylenediamine. In addition to the specific and generally mentioned diamines, primary monoamines such as, for example, alkylamines, alkanolamines, and arylamines can be used concurrently. It is also possible to use diamines concurrently with no tertiary amino group, buth rather, for example, a primary and a secondary amino group, such as, for example, N-methyl-ethylenediamine and N-ethylethylenediamine. Diprimary diamines such as ethylenediamine, propylenediamine, or hexamethylenediamine, and polyalkylenepolyamines, such as, for example, diethylenetriamine and triethylenetetramine, can be used in combination with the above-mentioned primary and tertiary diamines up to 50 mole-%. Nonprimary tertiary diamines are preferably used, however, only in an amount of 10 to 30%.

Solvents, such as, for example, toluene and xylene, are preferably used in the invention. These solvents are especially suitable for removing water from the system after the reaction.

Preferably, the copolymer is reacted with equimolar amounts of diamine, i.e., a primary amino group is also present per anhydride group of the copolymer. However, deviations from this relation are possible.

The diamine is appropriately reacted with the anhydride at elevated temperatures, whereby reaction under reflux is advisable. The solvent is distilled off upon completion of the imidation.

After the solvent has been separated from the reaction water, the imide-amine is partially neutralized with acid, such that 1 to 50% of the amine nitrogen atoms are neutralized, preferably 1 to 20%.

Acids used in the neutralization may include mineral acids, such as hydrochloric acid, sulfuric acid, phosphoric acid, or organic carboxylic acids such as formic acid, acetic acid, and the like. Preferably, however, sulfuric acid can be used, advantageously in dilute form.

Water is added after the partial neutralization to yield a dilute solution or emulsion, namely in amounts necessary to obtain a 5 to a maximum 50 weight-% solution or emulsion of the imide-amine.

The dilute emulsion or solution of the imide-amine is then quaternized with epichlorohydrin. Generally temperatures between 0° and 50° C. have proven to be suitable for this reaction. Preferably, however, quaternization is carried out at temperatures between 10° and 30° C., more preferably at room temperature.

In the quaternization process, epichlorohydrin can be used in such amounts that all tertiary amino groups are quaternized. Preferably, the teritary amino groups are quantitatively quaternized. It is also possible, however, to use smaller amounts of epichlorohydrin so that amino groups remain present that exist in part as basic tertiary amino groups and in part as amino groups neutralized by the use of acid.

A particularly suprising finding was that cationic sizing agents can be obtained in a simple way by using the process of the invention, without the feared gelation, as opposed to the case with the process disclosed in Unexamined West German Patent Application DE-OS 1,570,914. The resulting sizing agents, which become available directly as an aqueous solution or emulsion, can be used immediately as sizing agents, after further dilution, if so desired. It is not necessary to alter the activity of the sizing agent by changing the pH.

The solutions or emulsions can be stored for a long time, are molecularly highly dispersed, and do not tend to separate or gel during storage. They are particularly suitable as surface-sizing agents.

A particularly surprising finding was that they also exhibit high sizing activity for the sizing of paper made from so-called secondary fibers. Secondary fibers are fibrous paper stock obtained, for example, by recycling waste paper. Another particularly surprising finding was that the sizing agents of the invention are suitable for sizing grades of liner paper. "Liner" means corrugated board-base paper that forms the test liner in the corrugated board. Corrugated board can be made from unbleached kraft pulp or waste paper. Because the composition of grades of waste paper is subject to considerable fluctuation, a particularly effective sizing agent is required that also produces satisfactory sizing of paper if differences in the quality of raw stock are considerable.

The invention will now be described in greater detail with reference to the following examples, which are presented for illustrative purposes only, not for limitation:

EXAMPLE 1

Manufacture of the Alpha-Olefin—Maleic Anhydride Copolymer

Amounts weighed:2050 g (10 moles) C14/16 alpha-olefin, 1176 g (12 moles) maleic anhydride, and 100 ml of Trigonox B$^{tm}$ (di-tert-butyl peroxide, a commercial product from Akzo Chemie b.v., Amersfoort, Netherlands).

Execution:2050 g (10 moles) of C14/16 alpha-olefin are introduced, the reaction chamber is rinsed with nitrogen for 10 minutes, and heated to 160° C. At this temperature, 117.6 g (1.2 moles) of maleic anhydride and 10 ml of Trigonox B in each case are added at 30-minutes intervals. The heat of the reaction is removed by cooling. After the 10th addition, the mixture is left for another 2 hours at 160° C. Unconverted olefin is then distilled off at 200° C. in a water-jet vacuum. The resulting product has a molecular weight of about 12,000.

EXAMPLE 2

Imidation

Amounts weighed: 1075 g (4 moles) alpha-olefin-maleic anhydride copolymer, 1613 g xylene, 408 g (4 moles) dimethylaminopropylamine, and 8 g p-toluenesulfonic acid.

Execution: 1075 g (4 moles) of the copolymer according to Example 1 and 8 g of p-toulenesulfonic acid in 1613 g of xylene are introduced at 140° C. Over the course of 1 hour, 408 g (4 moles) of dimethylaminopropylamine are added. The mixture is boiled for another hour under reflux, then heated in a water separator. After the water has been separated, xylene is distilled off in a water-jet vacuum. The amine determination yields an amine value of 2.64 meq/g, i.e., an imide unit has a molecular weight of 379.

EXAMPLE 3

Quaternization 100 g of the imide amine described in Example 2 are added to 543 g of water at 80° C. with stirring and 10% neutralized with $H_2SO_4$ (=26 ml of 1 N $H_2SO_4$). In so doing, an emulsion forms with a very uniform particle distribution. Then, the emulsion is cooled to 20° C. and mixed with 24.4 g of epichlorohydrin (=100% of the amine nitrogen present) with stirring.

After 24 hours of reaction at 20° C., a clear solution forms from the emulsion, which has a solids content of 18%. The solution thus formed has a pH of 8.4 and may be used directly as the sizing agent.

EXAMPLE 4

Use as Surface-Sizing Agent

Unsized base paper (liner grade) with a surface weight of 160 g/m² is sized in a sizing press with a sizing liquor consisting of 5% oxidatively degraded starch and 0.4% sizing agent, as described in Example 3. The uptake in the sizing press is 30% for this base paper.

Under otherwise identical conditions, the surface sizing is carried out with a commercial sizing agent based on polyurethane.

The Cobb value is determined according to DIN Standard 53/22 - 1 Min.

|  | Commercial product | Sizing agent according to Example 3 |
|---|---|---|
| 1 minute Cobb value | 42 | 26 |

EXAMPLE 5

Use as Surface-Sizing Agent

Under otherwise identical conditions to those in Example 4, surface sizing is carried out with the difference that the base paper consists of 60% pine sulfate, 40% wood pulp, and 20% calcium carbonate.

the sizing liquor uptake for this grade of paper in the sizing press is 83%.

|  | Commercial product | Sizing agent according to Example 3 |
|---|---|---|
| Cobb value 1 minute | 48 | 24 |

We claim:

1. A process for the manufacture of a cationic sizing agent for paper, comprising:
   reacting an alpha-olefin with maleic anhydride at a molar ratio of alpha-olefin to maleic anhydride of 1:0.8 to 1:2 to form a copolymer with an average molecular weight of 3,000 to 30,000;
   reacting said copolymer with a polyamine having at least one tertiary amino group and one primary amino group at a molar ratio of anhydride group to polyamine of 2:1 to 1:1 to form a polymeric imide-amine;
   neutralizing 1 to 50% of the amino groups of said imide-amine with an acid;
   diluting said partially neutralized imide-amine with water to a 5 to 50 weight % emulsion; and
   quaternizing said diluted, partially neutralized imide-amine with epichlorohydrin.

2. The process according to claim 1, wherein said molar ratio of anhydride group to polyamine is 1.4:1 to 1:1.

3. The process according to claim 1, wherein said polyamine is an aliphatic diamine with a tertiary and a primary amino group.

4. The process according to claim 1, wherein said copolymer has an average molecular weight of 5000 to 15,000.

5. The process according to claim 1, wherein said alpha-olefin is bulk-polymerized with said maleic anhydride at a temperature of 140 to 200° C.

6. The process according to claim 1, wherein 1 to 20% of said amino group of said polymeric imide-amine are neutralized with said acid.

7. The process according to claim 1, wherein said acid is a mineral acid.

8. The process according to claim 7, wherein said mineral acid is sulfuric acid.

9. The process according to claim 1, wherein the quaternization with epichlorohydrin is carried out at a temperature of 10° to 30° C.

10. The process according to claim 9, wherein said quaternization is carried out at room temperature.

11. The process according to claim 1, wherein the tertiary amino groups of the poymeric imide-amine are quantitatively quaternized.

12. A sizing agent obtained by a process according to claim 1.

* * * * *

UNITED STATES PATENT AND TRADEMARK OFFICE
CERTIFICATE OF CORRECTION

PATENT NO. : 4,839,415
DATED : June 13, 1989
INVENTOR(S) : H. SCHURMANN et al

It is certified that error appears in the above-identified patent and that said Letters Patent is hereby corrected as shown below:

IN THE SPECIFICATION:

Column 3, line 37, change "buth" to --but--;

line 49, change "invention" to --imidation--.

Column 6, line 8, change "the" to --The--.

Signed and Sealed this

Third Day of April, 1990

Attest:

HARRY F. MANBECK, JR.

Attesting Officer

Commissioner of Patents and Trademarks